United States Patent Office 3,369,476
Patented Feb. 20, 1968

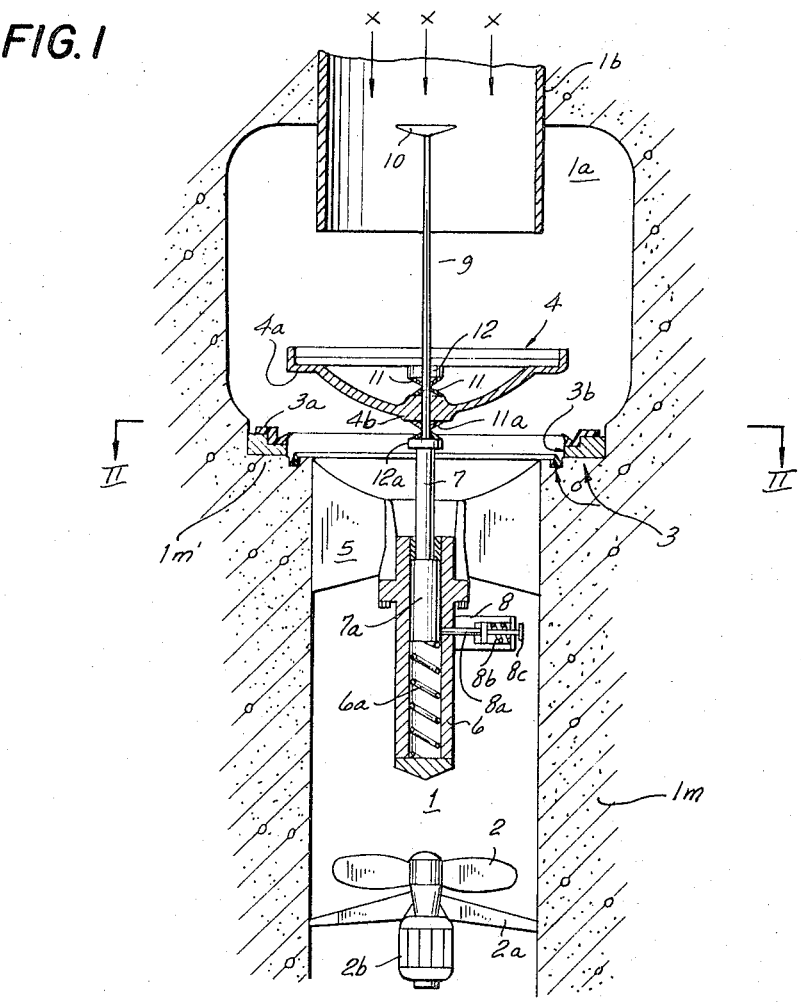

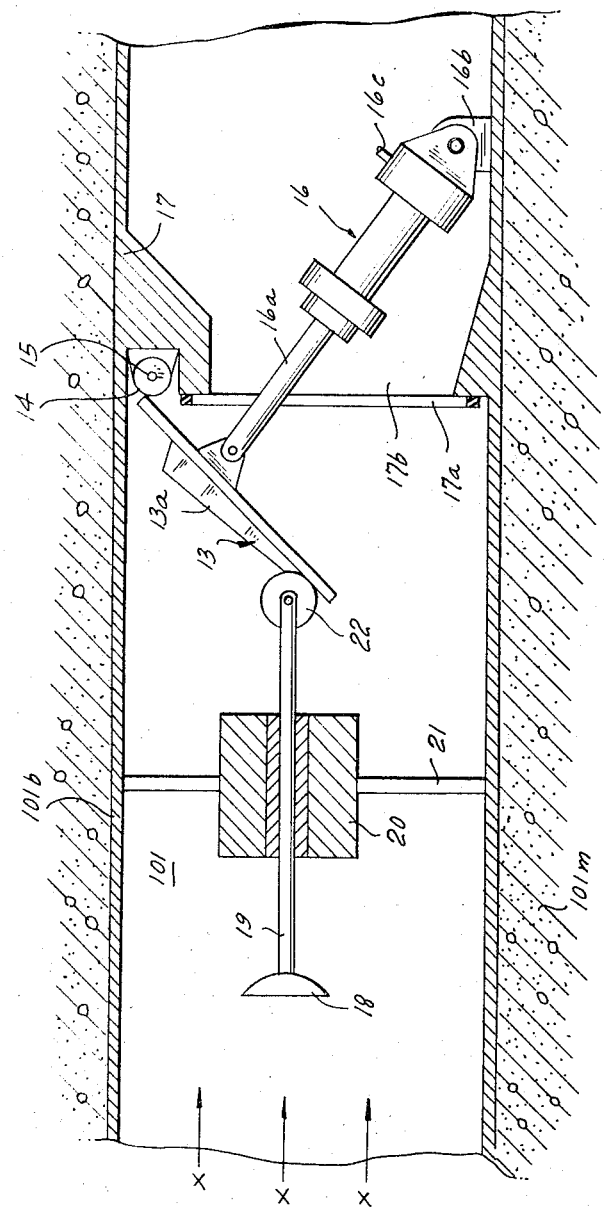

3,369,476
SAFETY VALVE FOR VENTILATING SHAFTS
OF SHELTERS AND THE LIKE
Rudolf Seiz and Heinz Eickhoff, Bochum, Germany, assignors to Bochumer Eisenhuette Heintzmann & Co., Bochum, Germany
Filed Sept. 20, 1965, Ser. No. 488,334
Claims priority, application Germany, Sept. 28, 1964, B 78,692
20 Claims. (Cl. 98—119)

The present invention relates to safety valves in general, and more particularly to improvements in safety valves which may be used in ventilating shafts leading to air raid shelters or to analogous protective enclosures for living beings and/or any such inanimate bodies or materials which should not be exposed to shock waves developing, for example, on explosion of conventional or nuclear bombs.

It is already known to provide the ventilating shaft of an air raid shelter with a safety valve whose valve member is normally open and which is arranged to close automatically in response to rising pressure resulting from an explosion at or relatively close to the intake end of the ventilating shaft. A serious drawback of such presently known safety valves is that their valve members, which must be sturdy enough to withstand the full presssure of one or more consecutive shock waves, offer too much resistance to rapid closing so that some toxic or other damaging ingredients of the shock wave are likely to penetrate into the shelter before the valve member assumes its sealing position. In other words, the interita of a relatively heavy and bulky valve mmeber prevents acceleration of the valve member to the actual speed of the shock wave so that the foremost zone of the shock wave can penetrate through the passage defined by the valve seat and into the sheltered enclosure where it might cause harm to human beings, animals or goods which happen to be located in the shelter. Even a delay which amounts to a small fraction of a second suffices to cause unimaginable harm, particularly in the event of nuclear, chemical or biological warfare. Small quantities of chemicals, toxic gases, gamma rays or other deleterious matter will suffice to affect or to annihilate the occupants of the shelter if the safety valve fails to close without any delay, namely, if the valve member cannot be accelerated at such a rapid rate that it prevents any, even minimal, quantities of harmful ingredients of a shock wave from entering the passage defined by the valve seat against which the valve member bears when the safety valve is closed.

The problem is further aggravated due to the fact that the safety valve normally should remain in fully open position so that the shelter can receive a requisite quantity of fresh air or that foul air can be evacuated at a rapid rate. An air raid shelter which must accommodate substantial numbers of persons must be provided with large ventilating shafts which, in turn, require very large safety valves comprising heavy and bulky valve members which must cover a considerable distance in order to move from the normal fully open position to sealing position. It is desirable, for obvious reasons, that the number of ventilating shafts should be held to a minimum because each such shaft represents one possible route for eventual penetration of harmful ingredients. In order that a single ventilating shaft, or a minimal number of ventilating shafts, can allow for proper circulation of air, the safety valve should offer a minimal resistance to flow of air when the valve member is moved away from its seat.

Of course, the inertia of a valve member can be reduced by making it of lightweight material or by reducing its strength. However, such measures are clearly unsatisfactory because they bring about a reduction in the resistance which the valve member can offer to deformation, cracking or total destruction when the safety valve must be closed. Furthermore, it was found that the inertia of a lightweight but relatively large valve member which is used in a safety valve mounted in a relatively large ventilating shaft is still too high so that the valve member cannot be rapidly accelerated to the actual speed of a shock wave.

Furthermore, and when the safety valve is mounted in a vertical or nearly vertical ventilating shaft (for example, in the top wall of an air raid shelter), the valve member must be held in open position by a relatively strong mechanism because the mechanism must overcome the weight of the valve member. In such constructions, the likelihood that the valve member will not close in time is even more pronounced. The force which keeps the valve member in normal open position should not be too small because, otherwise, the valve member might close in response to forced circulation of air by means of a fan, or the valve member will close in response to a relatively low pressure generated by a remote explosion which cannot represent a danger to the occupants of the shelter. Still further, the force needed to keep the valve member in open position should not be too weak because the safety valve normally remains closed only during periods of imminent danger, i.e., when the explosions take place in close proximity to the intake end of the ventilating shaft or when the military action takes place rather close to the shelter, because the enclosure must receive fresh air at intervals which cannot be too far apart if the occupants are to avoid suffocation due to lack of oxygen.

Accordingly, it is an important object of the present invention to provide a very simple, rugged, easy-to-install, and highly reliable safety valve whose valve member invariably prevents penetration of any harmful ingredients into the shelter and wherein such prevention of penetration of shock waves into the sheltered enclosure is achieved in an extremely simple and reliable manner.

Another object of the invention is to provide a safety valve of the just outlined characteristics wherein the valve member which is normally held in open position to permit circulation of air through the ventilating duct may be accelerated to the actual speed of a shock wave practically without any delay so that it will constitute an absolutely leakproof obstacle to penetration of harmful ingredients into the shelter.

A further object of the invention is to provide a safety valve which may be used with equal advantage in horizontal, vertical or inclined ventilating shafts, which may be used in ventilating shafts for underground or above-the-ground shelters, and which may be installed in shafts of circular, polygonal or other cross-sectional outline.

An additional object of the invention is to provide the improved safety valve with a novel motion transmitting system which will set the valve member in motion before the latter is subjected to the impact of a shock wave which enters the intake end of the ventilating shaft and is being propagated toward the seat of the safety valve.

A concomitant object of the instant invention is to provide a safety valve which may be provided with two or more valve members and wherein a single motion transmitting system suffices to overcome the inertia of all such valve members in good time before the shock wave advances too far into the interior of the ventilating shaft which accommodates the safety valve.

Still another object of the invention is to provide a safety valve which is constructed and assembled in such a way that it automatically remains in closed position until the air at the intake end is safe enough for inhalation by the occupants of the shelter.

Briefly stated, one feature of our invention resides in the provision of a safety valve for preventing penetration of shock waves through the ventilating shaft of an air raid shelter or the like, particularly for preventing penetration of shock waves which develop on explosion of nuclear or conventional bombs used in modern warfare. In its elementary form, the safety valve comprises valve seat means mounted in the shaft and defining at least one passage for the flow of air between the intake end and the discharge end of the shaft, sealing means including at least one main valve member provided in the shaft upstream of the valve seat means and movable from a normal open position to a second position of sealing engagement with the valve seat means, and motion transmitting means comprising at least one auxiliary valve member provided upstream of and arranged to effect movement of the main valve member from open position in response to the pressure exerted upon the auxiliary valve member by a shock wave which enters the intake end of the shaft and advances toward the valve seat means so that the main valve member is set in motion toward its second position prior to being subjected to the impact of the shock wave. Thus, the auxiliary valve member overcomes the inertia of the main valve member and insures that the latter can move to its second position at the speed at which the shock wave is being propagated toward the shelter as soon as it is actually reached by the shock wave whereby the main valve member seals the passage or passages defined by the valve seat means before the shock wave reaches such passage or passages.

It is preferred to provide the safety valve with biasing means including one or more springs, pneumatic cylinders or analogous devices which normally maintain the main valve member or members in open position.

The novel features which are considered as characteristic of the invention are set forth in particular in the appended claims. The improved safety valve itself, however, both as to its construction and its mode of operation, together with additional features and advantages thereof, will be best understood upon perusal of the following detailed description of certain specific embodiments with reference to the accompanying drawings, in which:

FIG. 1 is a central longitudinal section through a vertical ventilating shaft which is provided in the roof of an underground shelter and accommodates a safety valve which is constructed and assembled in accordance with a first embodiment of our invention, the main valve member being of circular outline and being shown in open position;

FIG. 2 is a horizontal section substantially as seen in the direction of arrows from the line II—II of FIG. 1;

Figure 4:
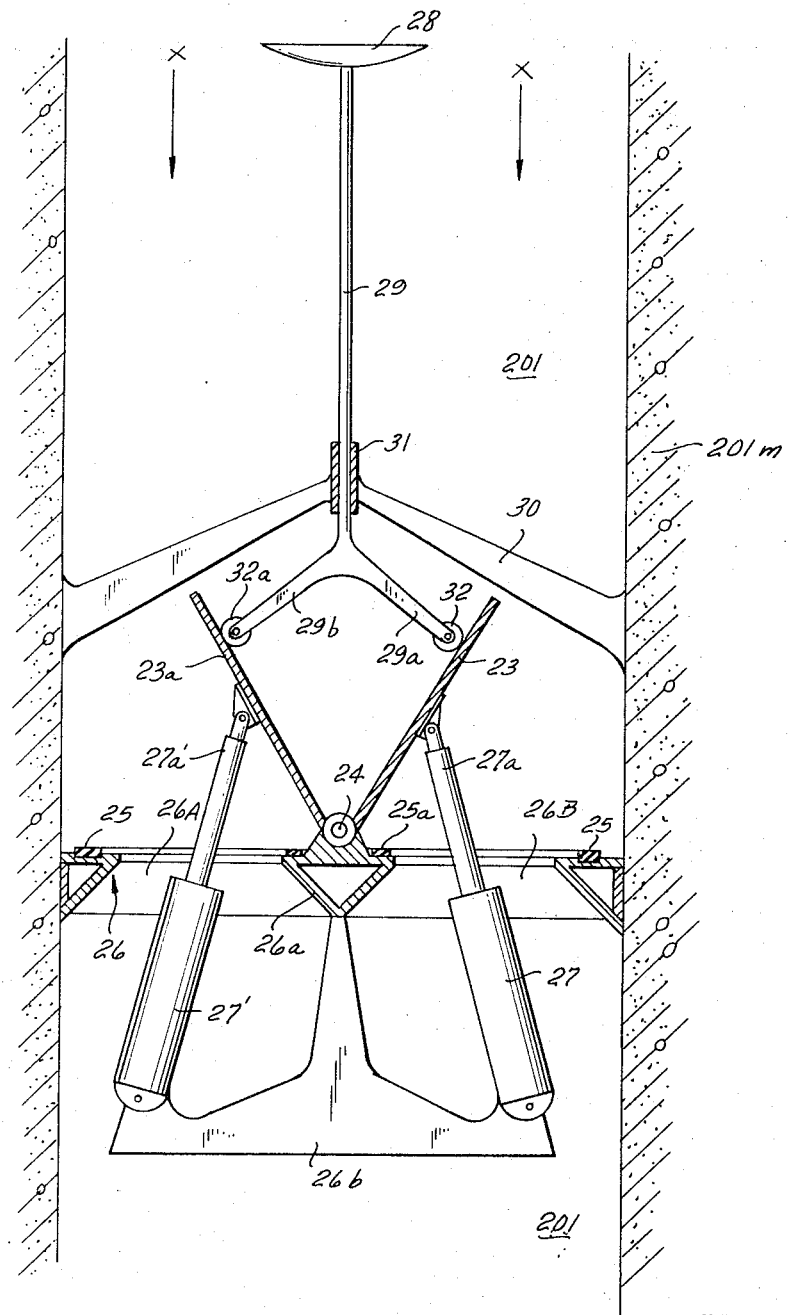

FIG. 3 is a central longitudinal section through a horizontal ventilating shaft which accommodates a modified safety valve comprising a hinged main valve member of rectangular outline; and FIG. 4 is a central longitudinal section through a vertical ventilating shaft of circular cross-sectional outline which accommodates a third safety valve whose main valve member comprises two hingedly connected flaps.

Referring first to FIGS. 1 and 2, there is shown a vertical or nearly vertical ventilating shaft 1 which is surrounded by a mass 1m of concrete and serves to admit air to an underground shelter. The concrete mass 1m is assumed to constitute the top wall or roof of the shelter, and the latter may be utilized to protect its occupants from shock waves developing on explosion of conventional or nuclear bombs. The shaft 1 of circular cross-sectional outline, and its lower portion which is nearer to its discharge end accommodates a fan 2 driven by a motor 2b and mounted on a preferably cruciform carrier 2a whose radially outwardly extending arms are anchored in the concrete mass 1m.

A median portion 1a of the shaft 1 constitutes a chamber which accommodates two main components of the improved safety valve, namely, an annular valve seat 3 which rests on an annular shoulder 1m' defined by the concrete mass 1m and a cupped sealing element or main valve member 4 which is normally maintained in the open position of FIG. 1. The upper portion of the ventilating shaft 1 which is nearer to the intake end is lined by a metallic cylinder or liner 1b. This liner 1b may extend all the way to the intake end and accommodates with considerable clearance a dished or funnel-shaped motion transmitting member or auxiliary valve member 10.

The upper end face of the valve seat 3 carries an annular cushion or gasket 3a of elastically deformable material which is engaged by the marginal portion 4a of the main valve member 4 when the latter is caused to descend to its second or sealing position in which it prevents the flow of air or any other fluid through the circular passage 3b defined by the valve seat.

The numeral 5 denotes a reinforcing grating or network or backing for the median portion of the main valve member 4. This backing 5 serves as an abutment for the median portion of the valve member 4 when the marginal portion 4a moves into sealing engagement with the elastic gasket 3a. As shown, the underside of the main valve member 4 is of concave shape and the backing 5 defines a concave socket for the member 4 to make sure that the latter can withstand exceptionally large pressures which tend to force the main valve member downwardly and toward the fan 2. The component parts of the backing 5 are firmly anchored in the concrete mass 1m, and this backing simultaneously serves as a holder or support for the means which biases the main valve member 4 to the open position of FIG. 1. The biasing means comprises a strong metallic cylinder 6, a piston 7a which is reciprocably telescoped into the cylinder 6, a helical expansion spring 6a which is accommodated in the lower part of the cylinder 6 and bears against the underside of the piston 7a, and a piston rod 7 which is rigid with the piston 7a and is coupled to the median portion of the main valve member 4. The axis of the cylinder 6 preferably coincides with the axis of the main valve member. The bias of the spring 6a is strong enough to normally maintain the main valve member 4 in the open position in which the marginal portion 4a is spaced from the elastic gasket 3a and allows a stream of air to flow downwardly or upwardly, depending on the purpose of the fan 2. It is clear, however, that the cylinder 6 and spring 6a may be replaced by one or more pneumatic cylinders.

The safety valve further comprises a locking device which is mounted on the cylinder 6 and whose function is to automatically retain the main valve member 4 in sealing position as soon as the marginal portion 4a descends into sealing engagement with the gasket 3a. In the illustrated embodiment, the locking device comprises a locking bolt or pin 8a which is mounted on a bracket 8 and extends radially of the cylinder 6. The latter is provided with a radial bore for the inner end portion of the locking bolt 8a, and this bolt is permanently biased by a prestressed helical spring 8b which tends to move it radially inwardly. When the safety valve is open, the tip of the bolt 8a abuts against the periphery of the piston 7a and the locking device is ineffective. The axial length of the piston 7a is selected in such a way that the bolt 8a may snap behind the upper end face of this piston when the marginal portion 4a of the main valve member 4 moves into sealing engagement with the annular gasket 3a of the valve seat 3. A manually operable knob 8c may be utilized to withdraw the locking bolt 8a from the bore of the cylinder 6 whereupon the spring 6a is free to expand and returns the main valve member 4 to open position provided, of course, that the pressure prevailing in the chamber 1a is substantially the same as that in the shelter. The knob 8c is connected with the locking bolt 8a and may also serve as a stop to limit the radially inward movement of the locking bolt.

In accordance with an important feature of our present invention, the piston rod 7 is provided with an upward extension or spindle 9 whose upper end portion is connected with the auxiliary valve member 10. In the illustrated embodiment, the diameter of the spindle 9 diminishes in a direction toward the auxiliary valve member 10, and the latter resembles a concavo-convex body whose concave side faces upwardly, i.e., toward the intake end of the shaft 1 so that it may be subjected to the pressure generated by a shock wave which travels in the direction indicated by arrows X. Another feature of the improved safety valve resides in that the main valve member 4 has limited freedom of axial movement with reference to the spindle 9. This is achieved by installing the central portion or hub 4b of the main valve member 4 between prestressed dished springs 11 and 11a, and by providing the spindle 9 with two rigid stops or spring retainers 12, 12a which are placed at such axial distance from each other that the valve member 4 can move axially if it overcomes the bias of the springs 11 or 11a.

The diameter of the main valve member 4 is a multiple of the diameter of the auxiliary valve member 10; for example, it may exceed the diameter of the valve member 10 four or more times. In other words, the internal diameter of the liner 1b is also a multiple of the diameter of the valve member 10, e.g., the maximum diameter of the ventilating shaft may exceed between four and six times the diameter of the valve member 10. The distance between the valve members 4 and 10 at least equals the maximum diameter of the ventilating shaft and may, for example, equal the combined length of two diameters of the liner 1b.

The operation of the safety valve is as follows:

When a shock wave (arrows X) enters the intake end of the ventilating shaft 1 and advances downwardly toward the chamber 1a, it exerts a strong pressure against the concave upper side of the auxiliary valve member 10 and immediately displaces the spindle 9 so that the latter overcomes the bias of the spring 6a and causes the main valve member 4 to leave its open position before the shock wave reaches the passage 3b which is defined by the valve seat 3. In other words, the pressure acting against the auxiliary valve member 10 overcomes the inertia of the main valve member 4 and also the bias of the spring 6a so that, as soon as it is subjected to the pressure generated by the shock wave, the main valve member 4 can travel at the speed of this shock wave and seals the passage 3b in the valve seat 3 before the foremost zone of the shock wave can move downstream of the valve seat. The acceleration of the main valve member 4 to the full speed of the shock wave is instantaneous because this valve member is set in motion before the shock wave impinges against its upper side. In fact, at the time it is subjected to the full impact of the shock wave, the main valve member 4 may be located in immediate proximity of its second or sealing position so that the interior of the shelter is fully protected from all deleterious ingredients of the shock wave.

A very important advantage of the stops 12, 12a and springs 11, 11a is that the auxiliary valve member 10 need not overcome the inertia of the main valve member 4 at the very instant when it is subjected to the pressure of an advancing shock wave. In other words, the auxiliary valve member 10 first accelerates only the spindle 9 and the parts which are rigidly connected therewith (including the piston rod 7 and piston 7a); the spindle sets the main valve member 4 in motion through the intermediary of the stop 12 and dished springs 11 at the time when the auxiliary valve mmeber 10 is already in motion. Also, when the marginal portion 4a of the main valve member 4 strikes against the gasket 3a, the latter must first withstand only the full impact of the main valve member whereas the impact of the spindle 9 and of the parts which are rigidly connected thereto is felt only at the time when the springs 11 are fully compressed so that the spindle 9 terminates its axial movement toward the discharge end of the ventilating shaft. The springs 11 and 11a cushion the impact of the stops 12, 12a against the hub 4b of the main valve member 4.

FIG. 3 illustrates a modified safety valve which is installed in a horizontal or substantially horizontal ventilating shaft 101 provided in a concrete side wall 101m of an above-the-ground air raid shelter. The shelter is located at the right-hand end of the ventilating shaft 101 and the latter is surrounded by a metallic liner 101b. It is assumed that the shaft 101 is of rectangular cross-sectional outline and that its intake end (insofar as the direction of movement of the shock wave is concerned) is located at the left-hand side of FIG. 3.

A median portion of the liner 101b is rigid with an annular valve seat 17 whose left-hand end face carries an elastically deformable cushion or gasket 17a. The main valve member or sealing element 13 resembles a rectangular flap and is pivotally secured to the liner 101b and/or to the valve seat 17 by means of a horizontally extending hinge 15 accommodated in a recess 14 extending along the upper portion of the valve seat 17. The main valve member 13 may be provided with reinforcing ribs 13a and is shown in open position in which it allows air to flow through the rectangular passage 17b defined by the valve seat 17. The means for biasing the main valve member 13 to such normal open position comprises a pneumatic cylinder 16 whose piston rod 16a is articulately coupled to a central portion of the main valve member. The right-hand end of the cylinder 16 is pivotally secured to a lug 16b provided on the liner 101b downstream of the valve seat 17. The main valve member 13 is located at the upstream side of the valve seat. The numeral 16c denotes the discharge end of a pneumatic conduit which serves to admit into the chamber of the cylinder 16 a compressed gas so as to maintain the main valve member 13 in open position. When moved to sealing position, the marginal portion of the main valve member 13 bears against the elastic gasket 17a and prevents the flow of any fluid past the valve seat 17.

The auxiliary valve member 18 again resembles a concavo-convex body and is mounted upstream of the main valve member 13. The spindle 19 which supports the auxiliary valve member 18 is guided in a stationary bearing 20 mounted in a preferably cruciform carrier 21 whose arms are securely affixed to the liner 101b.

The spindle 19 is reciprocable in the bearing 20 and its right-hand end carries a motion transmitting roller 22 which abuts against the adjacent outer side of the main valve member 13. The diameter of the auxiliary valve member 18 may approximate one-fourth of the height or width of the ventilating shaft 101, and the distance between the valve members 13, 18 may approximate twice the width or height of this shaft. The reference characters X again indicate the direction in which a shock wave is propagated to set the auxiliary valve member 18 in motion and to thereby overcome the inertia of the main valve member 13 before the latter is subjected to the full impact of the shock wave.

It is clear that the horizontal shaft 101 may also comprise an enlarged portion or chamber which accommodates the valve seat 17 and the main valve member 13, and also that the fluid-operated cylinder 16 may be replaced by the cylinder 6 of FIG. 1, or vice versa. It is equally clear that the ventilating shaft 101 may be one of circular cross-sectional outline. The roller 22 may be replaced by another suitable motion transmitting element, such as an arcuate cam which is rigidly attached to the right-hand end of the spindle 19 or a similar motion transmitting device.

In its open position, the main valve member 13 will offer relatively little resistance to the flow of air and, if desired, this valve member may be moved to a nearly horizontal open position because, during movement of the spindle 19 in a direction to the right, as viewed in FIG. 3, the effective area of the main valve member increases very rapidly so that the main valve member presents a relatively large surface to the oncoming shock wave and is immediately accelerated to the full speed of the wave.

Referring finally to FIG. 4, there is shown a third safety valve which is installed in a vertical ventilating shaft 201 having a circular or nearly circular cross-sectional outline. This shaft is surrounded by a concrete wall 201m and accommodates an annular valve seat 26 which is provided with a diametrically extending partition 26a so that it defines two separate passages 26A, 26B. The sealing means comprises a two-piece main valve member including two semi-circular sections or flaps 23, 23a which are respectively arranged to seal the passages 26B, 26A. The upper end face of the valve seat 26 is provided with elastic cushions or gaskets 25 and 25a which surround the passages 26A, 26B and which are sealingly engaged by the marginal portions of the flaps 23, 23a when the latter are caused to leave their normal open positions (shown in FIG. 4) and to pivot downwardly into a horizontal or nearly horizontal plane. The centrally extending partition 26a of the valve seat 26 supports a horizontal hinge 24 for the flaps 23, 23a, and the means for biasing these flaps to their respective open positions comprises two separate pneumatic cylinders 27, 27' whose piston rods 27a, 27a' respectively extend through the passages 26B, 26A and are articulately attached to the corresponding flaps. The lower ends of the cylinders 27, 27' are articulately connected to a downwardly extending carrier 26b which is integral with or is rigidly secured to the valve seat 26. The carrier 26b is located downstream of the passages 26A, 26B and the main valve member including the flaps 23, 23a is located upstream of the valve seat 26.

The upper portion of the ventilating shaft 201 accommodates a concavo-convex auxiliary valve member 28 which is mounted on an elongated spindle 29, the latter being reciprocably guided by a sleeve-like bearing 31 which is mounted in a cruciform carrier 30 having arms anchored in the wall 201m. The lower end portion of the spindle 29 is bifurcated and each of its legs 29a, 29b carries a motion transmitting roller 32, 32a respectively abutting against the upper side of the flaps 23, 23a. When a shock wave enters the intake end of the shaft 201 and travels downwardly, as indicated by the arrows X, it causes the auxiliary valve member 28 to set the flaps 23, 23a in motion so that these flaps pivot about their common hinge 24 even before their upper sides are subjected to the full impact of the shock wave.

FIG. 4 shows that the cylinders 27, 27' may maintain the flaps 23, 23a in nearly vertical positions so that these flaps normally offer little resistance to inflow of air into the shelter at the lower end of the shaft 201. Each of the flaps 23, 23a may be reinforced by ribs or other stiffening means, not shown.

It goes without saying that the safety valves of FIGS. 3 and 4, too, may be provided with automatic locking devices which retain the main valve member or members as soon as such valve members reach their respective sealing positions. Such locking devices insure that the valve cannot open prematurely, i.e., at a time when the pressure in the ventilating shaft upstream of the valve seat decreases but the air still contains undesirable ingredients which could harm the occupants of the shelter. Instead of being releasable by hand, the locking device for the main valve member or members may be released by automatic sensing, measuring or analogous detecting apparatus which will effect such release only after their component parts determine that the fluid which will penetrate through the ventilating shaft on opening of the safety valve is free of any deleterious matter. Such detecting apparatus may include a pressure gauge, a thermometer, a Geiger counter or any other known instrumentality which is capable of sensing the presence or absence of certain ingredients in the air at the intake end of the ventilating shaft.

Our present invention is based on the surprising discovery that a relatively small auxiliary valve member suffices to overcome the inertia of one or more relatively large, bulky and sturdy main valve members which are fully capable of preventing penetration of any damaging substances into an air raid shelter or the like, and that a relatively short distance between the auxiliary valve member and the valve seat suffices to insure that the main valve member or members move to sealing position prior to permitting any part of the shock wave to penetrate through the passage or passages of the valve seat. Once a main valve member is set in motion, it can be accelerated by the shock wave without any appreciable delay so that it travels at the speed of the shock wave and reaches the valve seat in good time to insure an absolutely reliable sealing action. The feature that the distance between the auxiliary valve member and the valve seat need not be too great is of particular importance when the ventilating shaft is relatively short and when it would be impractical to provide an extension of the ventilating shaft beyond the outer side of a wall through which the shaft extends. As stated herein-before, the maximum transverse dimension of the auxiliary valve member may be a small fraction of the maximum or average transverse dimension of the ventilating shaft so that the auxiliary valve member offers little resistance to the propagation of the shock wave. It is clear, however, that the safety valve may be provided with two or more auxiliary valve members, particularly if the main valve member comprises two or more flaps or sections. All that counts is to dimension the auxiliary valve member or members in such a way that they can set the main valve member or members in motion before the shock wave reaches a partly open main valve member. The dimensions of the auxiliary valve member or members and their distance from the main valve member or members depend on the transverse dimensions of the ventilating shaft, on the inertia of the main valve member or members, on the force of the biasing means which maintains the main valve member or members in open position, on the nature of shock waves which are expected (i.e., on the speed at which the expected shock wave is being propagated through the ventilating shaft), and on the desired extent to which the main valve member or members should move toward closed positions prior to being subjected to the full impact of the shock wave. It was found that the distance between the auxiliary and main valve members can be safely selected as being between two and three times the average diameter of a circular ventilating shaft or two or three times the width or height of a square ventilating shaft. As a rule, the ventilating shaft will be of circular cross-sectional outline because such shafts are easier to form and also because a cupped or ribbed main valve member of circular outline is capable of withstanding exceptionally high pressures. For the same reason, the auxiliary valve member preferably resembles a circular dish or funnel which diverges in a direction toward the intake end of the ventilating shaft.

As used in the appended claims, the expressions "downstream" and "upstream" respectively denote that a part is nearer to the shelter or to that end of the ventilating shaft which communicates with the atmosphere.

Without further analysis, the foregoing will so fully reveal the gist of the present invention that others can, by applying current knowledge, readily adapt it for various applications without omitting features which fairly constitute essential characteristics of the generic and specific aspects of our contribution to the art and, therefore, such adaptations should and are intended to be comprehended within the meaning and range of equivalence of the following claims.

What is claimed as new and desired to be protected by Letters Patent is:

1. A safety valve for preventing penetration of shock waves through an elongated ventilating shaft whose discharge end communicates with a shelter and whose intake end communicates with the atmosphere, comprising a valve seat mounted in the ventilating shaft and defining a passage for the flow of a fluid from the intake end toward the discharge end of the ventilating shaft; a reinforcing backing provided in the ventilating shaft downstream of said valve seat; an elongated spindle axially movably mounted in said backing and extending through said passage and upstream of said valve seat; a main valve member mounted on and reciprocable with said spindle, said main valve member being located upstream of said valve seat and being movable by the spindle from a normal open position to a second position of abutment with said backing and sealing engagement with said valve seat; and an auxiliary valve member mounted on said spindle upstream of said main valve member to effect movement of the main valve member from said open position in response to pressure exerted upon said auxiliary valve member by a shock wave which enters the intake end of the ventilating shaft and advances toward said valve seat so that said main valve member is set in motion toward said second position prior to being subjected to the impact of the shock wave.

2. A safety valve for preventing penetration of shock waves through an elongated ventilating shaft whose discharge end communicates with a shelter and whose intake end communicates with the atmosphere, comprising a valve seat mounted in the ventilating shaft and defining a passage for the flow of a fluid from the intake end toward the discharge end of the ventilating shaft; a reinforcing backing provided in the ventilating shaft downstream of said valve seat; an elongated spindle axially movably mounted in said backing and extending through said passage and upstream of said valve seat; a main valve member mounted with some axial play on and reciprocable with said spindle, said main valve member being located upstream of said valve seat and being movable by the spindle from a normal open position to a second position of abutment with said backing and sealing engagement with said valve seat; and an auxiliary valve member mounted on said spindle upstream of said main valve member to effect movement of the main valve member from said open position in response to pressure exerted upon said auxiliary valve member by a shock wave which enters the intake end of the ventilating shaft and advances toward said valve seat so that said main valve member is set in motion toward said second position prior to being subjected to the impact of the shock wave.

3. A safety valve as set forth in claim 2, comprising a pair of stops fixed to said spindle at the opposite sides of said main valve member and resilient means interposed between said main valve member and at least one of said stops.

4. A safety valve for preventing penetration of shock waves through an elongated ventilating shaft of circular cross-sectional outline whose discharge end communicates with a shelter and whose intake end communicates with the atmosphere, comprising an annular valve seat mounted in the ventilating shaft and defining a passage for the flow of a fluid from the intake end toward the discharge end of the ventilating shaft; a reinforcing backing provided in the ventilating shaft downstream of said valve seat; an elongated spindle axially movably mounted in said backing and extending axially of the ventilating shaft through said passage and upstream of said valve seat; a circular main valve member coaxially mounted on and reciprocable with said spindle, said main valve member being located upstream of said valve seat and being movable by the spindle from a normal open position to a second position of abutment with said backing and sealing engagement with said valve seat; and an auxiliary valve member mounted on said spindle upstream of said main valve member to effect movement of the main valve member from said open position in response to pressure exerted upon said auxiliary valve member by a shock wave which enters the intake end of the ventilating shaft and advances toward said valve seat so that said main valve member is set in motion toward said second position prior to being subjected to the impact of the shock wave.

5. A safety valve for preventing penetration of shock waves through an elongated ventilating shaft whose discharge end communicates with a shelter and whose intake end communicates with the atmosphere, comprising a valve seat mounted in the ventilating shaft and defining a passage for the flow of a fluid from the intake end toward the discharge end of the ventilating shaft; a reinforcing backing provided in the ventilating shaft downstream of said valve seat; an elongated spindle axially movably mounted in said backing and extending through said passage and upstream of said valve seat; a main valve member mounted on and reciprocable with said spindle, said main valve member being located upstream of said valve seat and being movable by the spindle from a normal open position to a second position of abutment with said backing and sealing engagement with said valve seat; biasing means provided on said backing and arranged to move said spindle axially so as to maintain the main valve member in said open position; and an auxiliary valve member mounted on said spindle upstream of said main valve member to effect movement of the main valve member from said open position in response to pressure exerted upon said auxiliary valve member by a shock wave which enters the intake end of the ventilating shaft and advances toward said valve seat so that said main valve member is set in motion toward said second position prior to being subjected to the impact of the shock wave.

6. A safety valve as set forth in claim 5, wherein said biasing means comprises a cylinder mounted on said backing, a piston reciprocably received in said cylinder and connected with said spindle, and means for normally maintaining said piston in an end position in which the piston maintains said main valve member in open position.

7. A safety valve for preventing penetration of shock waves through an elongated ventilating shaft leading to a shelter or the like, comprising a valve seat mounted in the shaft; a main valve member provided in said shaft upstream of said valve seat; hinge means pivotally securing said main valve member to the material surrounding said shaft so that the main valve member is pivotable about an axis which is normal to the longitudinal direction of the shaft and is movable between a normal open position and a second position of sealing engagement with the valve seat; and an auxiliary valve member provided upstream of said main valve member and operatively connected to said main valve member for moving the same from said open position in response to pressure exerted upon said auxiliary valve member by a shock wave which enters the shaft and advances toward said valve seat so that said main valve member is set in motion toward said second position prior to being subjected to the impact of the shock wave.

8. A safety valve as set forth in claim 7, further comprising means for biasing said main valve member to open position, said biasing means comprising a fluid operated cylinder at least a portion of which is mounted in said shaft downstream of said valve seat.

9. A safety valve as set forth in claim 7, further comprising a bearing provided in said shaft intermediate said valve members, an elongated spindle reciprocably guided in said bearing in the longitudinal direction of the ventilating shaft and having one of its ends connected with said auxiliary valve member, and a motion transmitting member provided at the other end of said spindle and engaging said main valve member to move the latter from said open position in response to such pressure exerted against said auxiliary valve member which causes said spindle to move in said bearing in a direction toward said valve seat.

10. A safety valve as set forth in claim 7 for preventing penetration of shock waves through a ventilating shaft of polygonal cross-sectional outline, wherein said main valve member is of polygonal outline and the distance between said valve members at least equals the maximum transverse dimension of the ventilating shaft.

11. A safety valve for preventing penetration of shock waves through an elongated ventilating shaft leading to a shelter or the like, comprising a valve seat mounted in said shaft and comprising a substantially centrally located partition defining with the remainder of said valve seat a pair of passages through which a fluid may flow through said valve seat; a hinge secured to said partition and extending transversely of the ventilating shaft; a pair of flaps articulately connected to said hinge so that each thereof is movable from a normal open position to a second position of sealing engagement with said valve seat whereby each flap seals one of said passages, said flaps being located upstream of said valve seat; and a valve member provided upstream of said flaps and operatively connected to said flaps for moving the same from the respective open positions to second positions in response to pressure exerted upon said valve member by a shock wave which enters the ventilating shaft and advances toward said valve seat so that said flaps are set in motion toward the respective second positions prior to being subjected to the impact of the shock wave.

12. A safety valve as set forth in claim 11, further comprising a bearing provided in the ventilating shaft intermediate said flaps and said valve member, a spindle reciprocably guided by said bearing longitudinally of the ventilating shaft, said spindle having a first end portion secured to said valve member and a bifurcated second end portion provided with a pair of motion transmitting means each arranged to move one of said flaps from open position in response to axial movement of the spindle toward said valve seat.

13. A safety valve as set forth in claim 11, further comprising a pair of biasing means each arranged to normally maintain one of said flaps in open position, each of said biasing means comprising a first portion provided at the downstream side of said valve seat and a second portion extending through the respective passage in the open position of the corresponding flap.

14. A safety valve for preventing penetration of shock waves through an elongated substantially straight ventilating shaft of a shelter or the like, comprising, in combination, valve seat means mounted in the shaft; sealing means provided in the shaft upstream of said valve seat means and movable from a normal open position to a closed position in sealing engagement with said valve seat means; a member extending transverse to the elongated ventilating shaft and having a maximum transverse dimension considerably smaller than that of the shaft, said member being arranged in the shaft upstream and spaced from said sealing means; guide means mounting said member movably in longitudinal direction of the shaft; and motion transmitting means between said member and said sealing means arranged to effect movement of said sealing means from said open to said closed position in response to pressure exerted upon said member by a shock wave which enters the shaft and travels toward said valve seat means so that said sealing means is set in motion prior to being subjected to the impact of the shock wave.

15. A safety valve as defined in claim 14, wherein said member has a concave end face facing the intake end of the ventilating shaft.

16. A safety valve as defined in claim 14, wherein said member is arranged coaxially with the ventilating shaft.

17. A safety valve as defined in claim 14, wherein said member is spaced from said sealing means a distance which is at least equal to the maximum transverse dimension of the ventilating shaft.

18. A safety valve as defined in claim 14, wherein said maximum transverse dimension of said member equals between 1/4 and 1/6 of the maximum transverse dimension of the ventilating shaft.

19. A safety valve as defined in claim 14, and including biasing means cooperating with said sealing means for normally maintaining the latter in said open position.

20. A safety valve as defined in claim 14, and including locking means for automatically retaining said sealing means in said closed position.

References Cited

UNITED STATES PATENTS

| | | | |
|---|---|---|---|
| 2,926,690 | 3/1960 | Martin | 137—460 |
| 3,064,552 | 11/1962 | Ehrsam et al. | 98—119 |
| 3,139,811 | 7/1964 | Sickel et al. | 98—119 |
| 3,173,356 | 3/1965 | Schierse et al. | 98—119 |
| 3,244,194 | 4/1966 | Henry | 137—460 |

FOREIGN PATENTS 854,836  11/1952  Germany.

ROBERT A. O'LEARY, *Primary Examiner.*

M. A. ANTONAKAS, *Assistant Examiner.*